Dec. 25, 1934.  F. BAUMGARTNER  1,985,759
TIRE INFLATING VALVE AND GUAGE
Filed Aug. 7, 1931
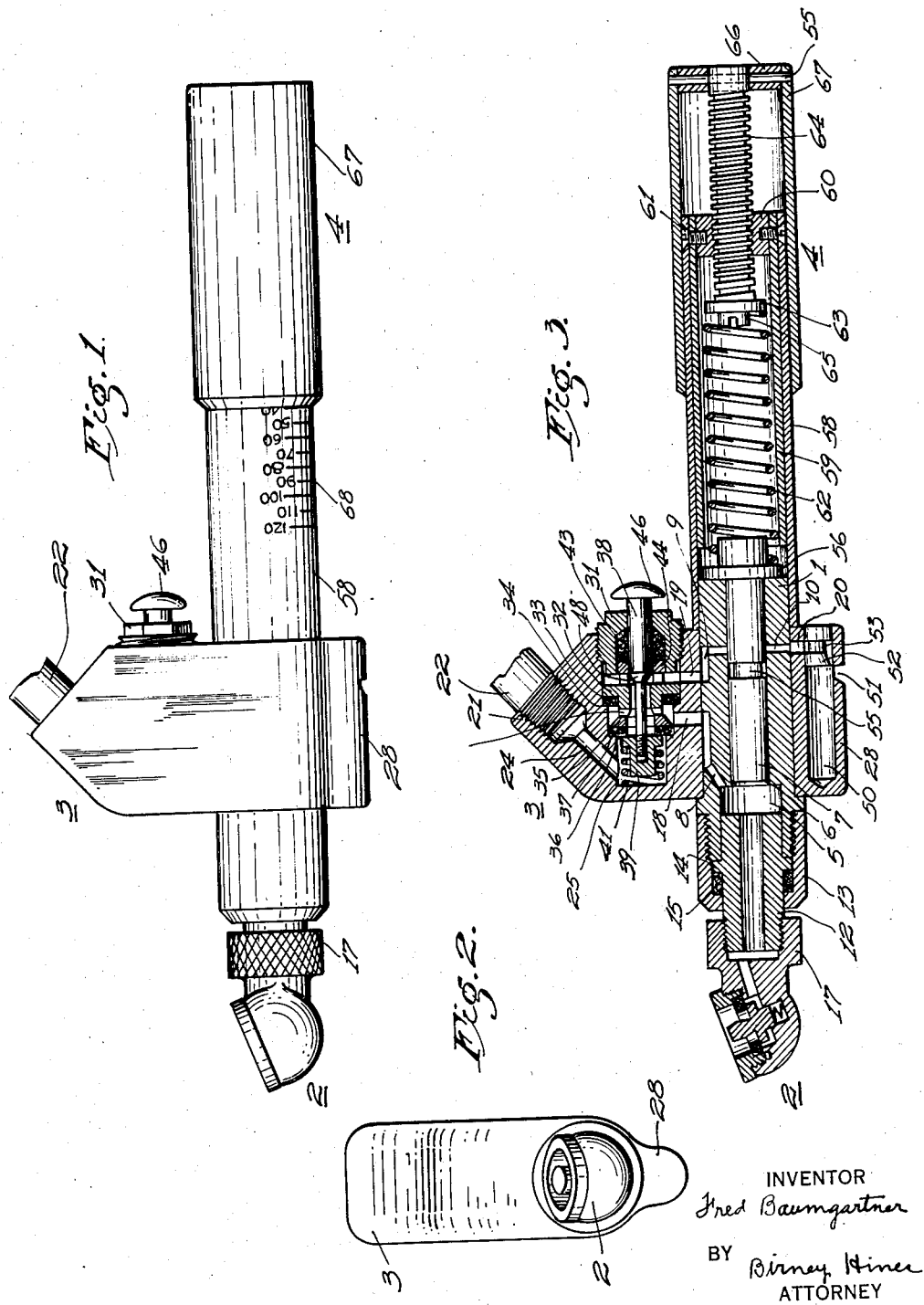
INVENTOR
Fred Baumgartner
BY Birney Hines
ATTORNEY Patented Dec. 25, 1934

1,985,759

UNITED STATES PATENT OFFICE 1,985,759

TIRE INFLATING VALVE AND GAUGE

Fred Baumgartner, Chicago, Ill.

Application August 7, 1931, Serial No. 555,737

2 Claims. (Cl. 152—11.5)

My invention relates to tire inflating valve and gauge devices and more particularly to such devices of this character as are provided with means for indicating when a tire has been inflated to a predetermined pressure.

One of the objects of my invention is to provide a tire inflating valve and gauge device which shall be so "fool-proof" in design and so rugged in construction that it will be particularly well adapted for use in service stations and garages where such devices usually receive very careless handling.

Another object of my invention is to provide a tire inflating valve and gauge device which shall make possible the quick and safe inflation of any tire to a predetermined pressure.

Another object of my invention is to provide a tire inflating valve and gauge device which shall not require any lubrication and which will, therefore, work equally well in winter and summer.

It is also an object of my invention to provide an inflating valve and gauge device in which the piston or plunger for gauging the air pressure may also act as a valve for operating a signal, such as a whistle, for indicating when a tire has been inflated to a predetermined pressure.

Other objects of my invention will, in part, be apparent and will, in part, appear hereinafter.

For an illustration of one of the various forms my invention may take, reference may be had to the accompanying drawing in which:

Figure 1 is a view, in side elevation, of a tire inflating valve and gauge embodying my invention;

Fig. 2 is an end view of the device shown in Fig. 1; and

Fig. 3 is a view, in section, showing the inner construction of the valve and gauge illustrated in Fig. 1.

Referring more particularly to the drawing, I have illustrated a tire inflating valve and gauge comprising a body including a member or cylinder 1, a head or chuck 2, a valve and whistle housing 3 and a pressure gauge 4.

The cylinder 1 is provided with a chamber 5 which communicates with a piston chamber 6 in which is disposed a piston 7. Air passageways 8, 9 and 10 are also provided in the walls of the cylinder for permitting the passage of air under certain conditions to be hereinafter described.

The head 2 of well known construction for connecting the device to a tire valve stem is screw-threaded upon one end of a hollow stem 12, the other end of which is mounted in the air chamber 5 and is retained in that position by a collar 13 which is screw-threaded upon the end of the cylinder. The stem 12 is provided with a shoulder 14 which cooperates with the lips of the collar 13 to prevent withdrawal of the stem from the cylinder, but which permits the stem to be easily turned or rotated in the cylinder. A ring 15 of any suitable packing material is disposed on the stem 12 between the shoulder 14 and the lips of the collar 13 to prevent any leakage of air therebetween. A knurled shoulder 17 on the head 2 provides a means whereby the head and stem may be readily rotated by the fingers to a suitable position to engage the valve stem of the tire to be inflated.

The valve housing 3 is mounted upon the cylinder 1 by means of a press fit in such position that air passageways 18, 19 and 20 in the housing will register, respectively, with the air passageways 8, 9 and 10 in the cylinder. In the upper face of the valve housing is provided a screw-threaded opening 21 in which a hose connection 22 may be secured to connect the device with a suitable source of compressed air (not shown). Leading from the air hose opening 21 is an air passageway 24 that connects with a chamber 25 in the housing, which, in turn, is connected to the air passageway 18 through which air may be supplied from the source of compressed air to the tire. The chamber 25 is also connected with the air passageway 19 so that air may flow from the tire to an indicator or signal device such as a whistle 28 disposed in the lower part of the housing 3.

In order to control the flow of air from the hose 22 into the tire to inflate it, or from the tire into the whistle to determine when the tire is sufficiently inflated, a valve mechanism 30 is disposed in the chamber 25.

The valve mechanism 30 comprises a screw-threaded plug 31 that may be screwed into the open end of the chamber 25, a collar 32, a ring 33 of suitable packing material disposed between the collar 32 and a shoulder 34 in the chamber, a washer 35 disposed adjacent to the left-hand end of the collar 32, a ring 36 of packing material disposed between the washer 35 and a shoulder 37 in the chamber, a valve stem 38 that extends through the centers of the parts just described, a compressed air valve or valve cap 39 that is screw-threaded upon the inner end of the valve stem, and a compressed spring 41 seated between the inner end of the chamber and the valve cap.

The right-hand portion of the valve stem is comparatively large in diameter and is slidably seated in a hole in the center of the plug 31. A packing ring 43 of suitable material is disposed in the plug around the valve stem to prevent leakage of air. A packing gland 44 is also disposed in the plug 31 to hold the packing ring in position and also to provide a second bearing for the enlarged portion of the valve stem. The left-hand end of the gland is turned down and slotted to provide a circular passage for air. There is also a circular air path on the left end of the plug 31, so that air can flow around and through the slots.

The valve mechanism 30 is assembled by mounting all the parts on the valve stem 38 and then screwing the plug 31 tightly in place.

The left-hand portion of the valve stem 38 is comparatively slender where it passes through the large hollow centers of the collar 32, the washer 35 and the packing ring 36, until it enters and is secured to the valve 39 by the screw-threaded connection therein. The difference in size between the slender portion of the valve stem and the hollow centers of the washers, etc. permits air to flow along the slender stem.

As shown, the compressed spring 41 biases the valve cap 39 into position against the rubber ring or washer 36, and thereby normally prevents any air passing from the hose 22 through the passageway 24 into the hollow centers of the ring 36, the washer 35 and a slot 45 in the face of the collar 32, and thence into the passageway 18 leading to the tire. Therefore, it will be seen that, when pressure is applied to a button 46 on the outer end of the valve stem 38, the stem will move the valve cap 39 to the left against the pressure of the spring 41 and thereby open the valve to permit air to flow from the hose into the passageway 18 and thence into the tire.

The middle portion of the valve stem 38 is provided with a shoulder constituting a whistle valve 48 that cooperates with the right-hand face of the collar 32 to control the flow of air therethrough into a slot in the face of the plug 31, a slot in the left end of the gland 44 and thence into the air passageway 19. As shown, the position of the valve 48 with reference to the valve or valve cap 39 is such that, when valve 48 is closed, valve 39 is opened; and when valve 39 is closed, valve 48 is opened. Therefore, air from the hose may flow through valve 39 into the tire only when valve 48 is closed, and, on the other hand, air from the tire may flow through valve 48 into the whistle only when the valve 39 shuts off the air from the hose.

The whistle 28 comprises a chamber 50 provided with an opening 51 through which air may escape to the atmosphere, and a plug 52 which so controls the flow of air that a whistling sound is produced when air is forced through it. The air passageway 53 in the plug 52 connects with the passageway 10 to provide an entrance to the whistle.

The piston 7 in the cylinder 1 is provided with a groove or signal valve 55 that cooperates with the air passageways 9 and 10 to afford a second means for controlling the passage of air to the whistle only when the pressure in the tire has reached a predetermined pressure. In its normal position, the piston 7 is disposed with the valve 55 at the left of the air passageways 9 and 10, so that no air can pass from the passageway 9 to the passageway 10. The head 56 of the piston limits its movement to the left. The movement of the piston to the right, under the pressure of air in the tire, to open the valve 55 is controlled by the gauge 4.

The pressure gauge 4, which is similar to the well known Schrader valve, with its parts reversed, comprises an outer cylindrical shell 58 that is securely mounted upon the right-hand end of the cylinder 1 by means of a press fit. Within the shell 58 is disposed a second cylindrical shell 59 which is provided with a plug or head 60. A pair of screws 61 pass through the wall of the outer shell, the wall of the inner shell and into the plug 60 to hold these parts together. As shown, the inner end of the shell 59 does not extend quite to the end of the cylinder 1 and thereby provides a means for limiting the movement of the piston 6 to the right. This prevents the piston valve 55 from moving past the air passageways 9 and 10.

Disposed within the inner shell 59 is a compression spring 62 for biasing the piston 7 against operation by the pressure of the air in the tire to open the valve 55. One end of the spring is seated on the head of the piston 7 and the other end bears against a washer 63 which is secured to the inner end of a screw-threaded shaft 64 by a screw 65.

The screw-threaded shaft 64 is threaded through the center of the plug 60 and thence extends outwardly to a head 66 firmly fixed in the outer end of a tube 67 which is telescopically mounted on the right-hand end of the outer shell 58. A pin 65 passes through the wall of the tube 67, the head 66 and the shaft 64 to pin the parts securely together so that rotation of the tube on the outer shell will cause rotation of the screw-threaded shaft to effect compression of the spring for biasing the piston 7 to the left. Thus it is seen that the resistance of the piston 7 to the pressure of air in the tire may be controlled by rotating the tube 67 to compress the spring 62 to any desired degree. A graduated scale 68 of compression is provided on the outer shell whereby the user may adjust the gauge for any predetermined pressure.

Operation of the device may be effected as follows: Assuming that it is desired to inflate a tire to a pressure of 40 pounds per square inch, then the tube 67 is turned until its left-hand edge is at the "40" point on the graduated scale 68. This action rotates the screw-threaded shaft 64 in the head 60 and causes the spring 62 to bear against the piston 7 with a pressure corresponding thereto.

Next the head 2 of the device is pressed against the valve stem (not shown) of the tire to be inflated to open the valve in the tire and the thumb is pressed against the button 46 of the valve stem 38 to move it inwardly. The inward movement of the valve stem 38 closes valve 48 and opens valve 39. The closing of valve 48 prevents air flowing from the chamber 25 through the air passageways 19 and 9 toward the whistle 28. The opening of valve 39 permits air to flow from the air hose 22, through the passageway 24, chamber 25, valve 39, the passageway around the slender portion of the valve stem, through the centers of the washers 35 and 36, the slot 45 in the face of collar 32, the passageways 18 and 8, the chamber 5 and thence through the stem 12 and the head 2 into the tire. If the air pressure during this operation is sufficient to move the piston to the right, it has no effect on the whistle because the valve 48 is closed.

When it is desired to ascertain whether or not the tire has been inflated to the desired 40 pounds per square inch, the button 46 is released, thereby permitting the valve stem 38 to move to the right under the pressure exerted by the spring 41. The movement of the valve stem 38 to the right closes valve 39 and opens valve 48. The closing of valve 39 shuts off the air from the air hose 22. The opening of the valve 48 permits air to flow from the tire through the head 2, the stem 12, chamber 5, passageways 8 and 18, the slot 45, and thence along the slender portion of the valve stem through the collar 32, the valve 48, the slot in the packing gland 44, the slot in the plug 31 and into the passageways 19 and 9 leading to the whistle.

Assuming now, however, that the tire has not yet been inflated to the desired pressure, then the air pressure in the tire is not sufficient to force the piston 7 to the right against the predetermined pressure of the spring 62. Therefore, the valve 55 in the piston has not connected the passageways 9 and 10. Consequently, no air can flow from the tire to the whistle and no whistling sound will be heard. Therefore, the button 46 is again pressed to admit air from the air hose 22 to the tire until it is judged that the tire is sufficiently inflated, when the button 46 is again released.

Assuming now that the tire has been inflated to somewhat more than the desired pressure, then the pressure in the tire will move the piston 7 to the right against the pressure of the spring 62 until the valve 55 opens the passage from passageways 19 and 9 to the passageways 10 and 20 into the whistle 28, thereby permitting air to flow directly from the tire through the whistle and causing it to sound the whistle. In this case, the air will blow off through the whistle until the pressure in the tire is reduced to the desired amount, then the reduced pressure in the tire permits the piston 7 to move to the left under pressure of the spring 62, thereby closing the valve 55 and stopping the whistling sound, which indicates that the tire is now at its desired pressure.

If it is desired to release the air more rapidly from the tire than it flows through the whistle, the head 2 may be lifted slightly from the tire stem valve to permit air to blow off between the tire valve and the head.

Therefore, it is seen that I have provided a tire valve and gauge device of strong, rugged and "foolproof" construction that may be easily employed for quickly and safely inflating a tire to any predetermined pressure. It will also be seen that the gauge portion of the device provides a convenient handle for its operation.

While I have shown and described only one specific form of my invention, I realize that it is susceptible of wide application, and I do not desire to be limited to the precise construction illustrated and described.

I claim as my invention:

1. A tire inflating valve and gauge device comprising a body portion carrying a connecting chuck and having a passage therein leading from a compressed air inlet to said chuck, a normally closed valve in said passage, a portion of said passage constituting a pressure chamber, a signal device mounted on the body and a second passage joining the first named passage between the normally closed valve and the pressure chamber and leading to said signal device, a normally open valve in said second passage so arranged that it is closed when the normally closed valve is opened, means for manually operating said valves, a normally closed valve in said second passage adjacent the signal device, and a pressure responsive element in the pressure chamber arranged to open the last named valve upon accumulation of a predetermined pressure in the pressure chamber.

2. A tire inflating valve and gauge device comprising a body portion carrying a connecting chuck and having a passage therein leading from a compressed air inlet to said chuck, and having a pressure chamber connected to said passage, a normally closed valve in said passage between the air inlet and the connection of the pressure chamber in said passage, a signal device mounted on the body and a second passage joining the first named passage between the normally closed valve and the pressure chamber and leading to said signal device, a normally open valve in said second passage so arranged that it is closed when the normally closed valve is opened, means for manually operating said valves, a normally closed valve in said second passage adjacent the signal device, and a pressure responsive element in the pressure chamber arranged to open the last named valve upon accumulation of a predetermined pressure in the pressure chamber.

FRED BAUMGARTNER.